C. J. EASTMAN.
TRACTOR.
APPLICATION FILED MAY 14, 1913.
1,140,969.
Patented May 25, 1915.
3 SHEETS—SHEET 1.
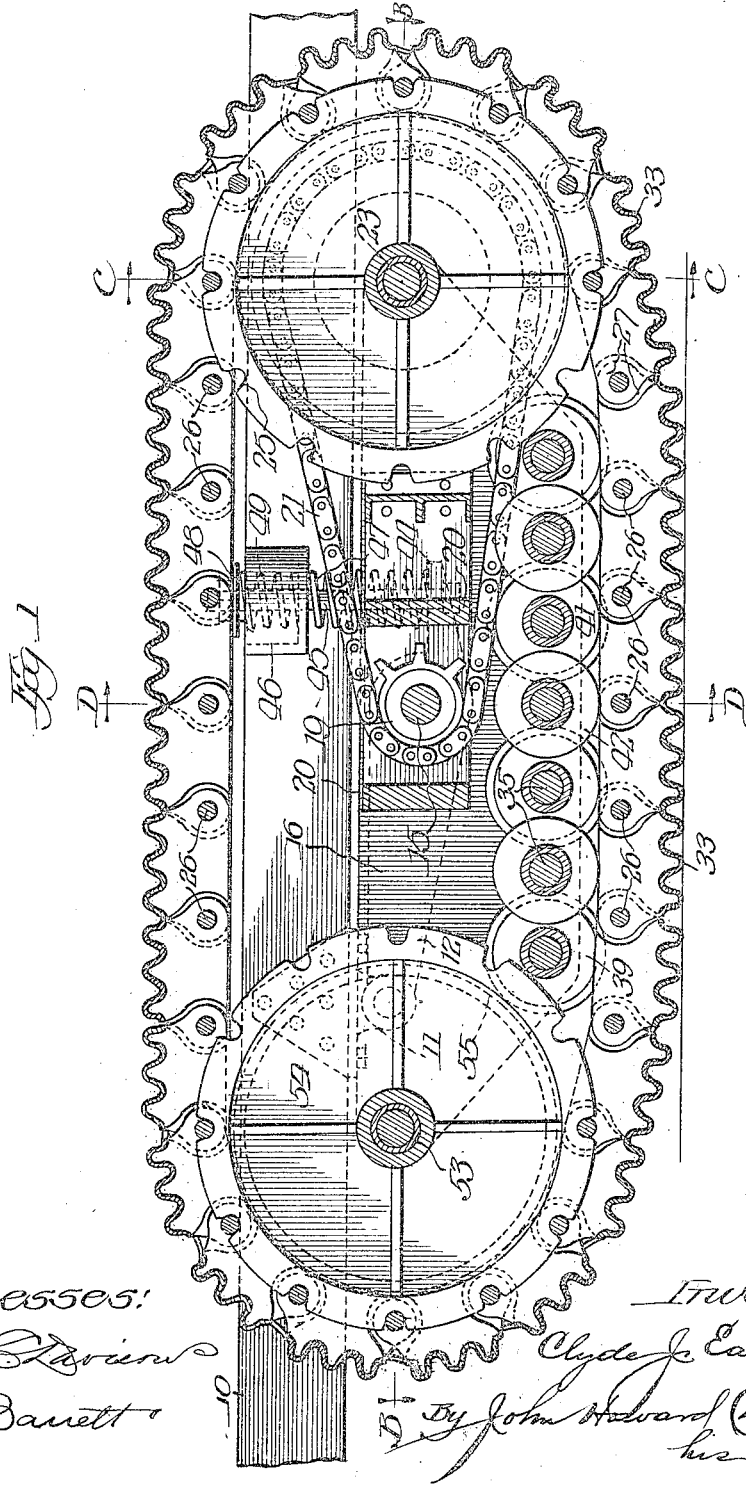

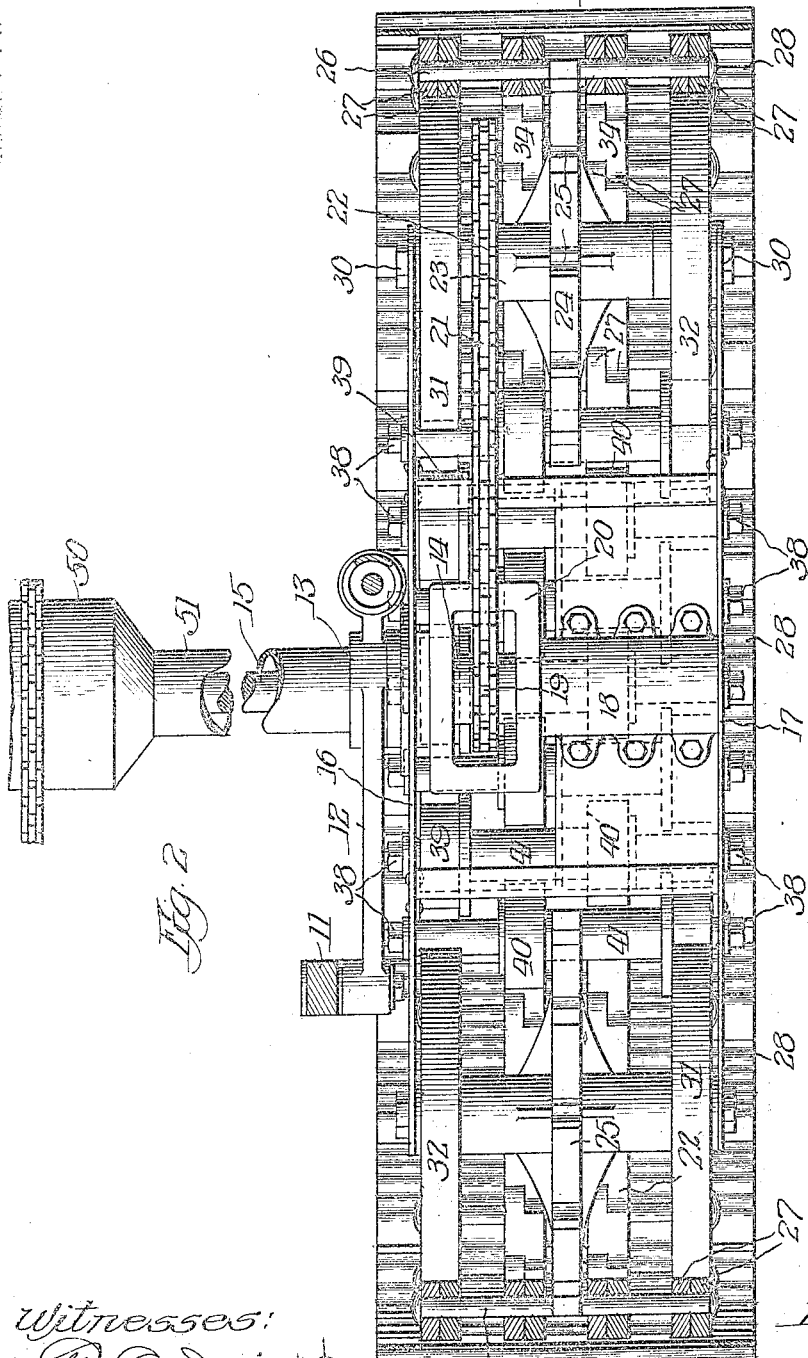

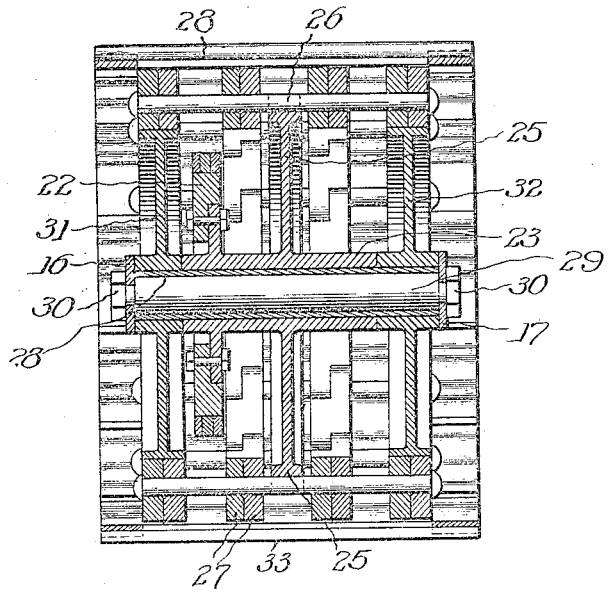
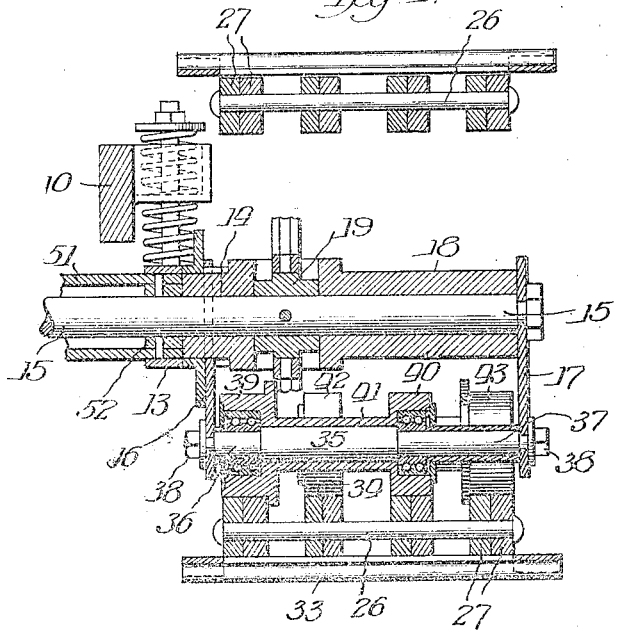

UNITED STATES PATENT OFFICE.

CLYDE J. EASTMAN, OF LOS ANGELES, CALIFORNIA.

TRACTOR.

1,140,969.

Specification of Letters Patent.

Patented May 25, 1915.

Application filed May 14, 1913. Serial No. 767,322.

*To all whom it may concern:*

Be it known that I, CLYDE J. EASTMAN, a citizen of the United States, and a resident of Los Angeles, in the county of Los Angeles and State of California, have invented certain new and useful Improvements in Tractors, of which the following is a full, clear, and exact specification.

My invention is concerned with tractors designed for use over wet, sandy or irregular ground, in which a pair of broad endless tracks are laid down by the tractor as it advances, and upon which broad tracks the weight of the tractor is supported.

My improvements are designed to make such a tractor more flexible than any of those with which I am acquainted, and also to distribute the weight of the tractor upon the shoe sections of the track in a better manner than has heretofore been possible.

To illustrate my invention, I annex hereto three sheets of drawings, in which the same reference characters are used to designate identical parts in all the figures, of which,—

Figure 1 is a side elevation of one of the trucks in vertical section on the line A—A of Fig. 2; Fig. 2 is a top plan view, with the upper half of the track removed as if in section on the line B—B of Fig. 1; Fig. 3 is a vertical section on the line C—C of Fig. 1; and Fig. 4 is a similar view, in section on the line D—D of Fig. 1.

In carrying out my invention, I employ an engine frame 10, which may be of any desired construction, and which has a pair of horizontal side pieces, one of which is shown in Fig. 1. Extending downward from each of these side pieces, and suitably secured to it in any desired manner, is a bearing ear 11, on which is pivoted the end of the jack-shaft supporting lever 12, of which there will be two, one for each side of the machine and for each of the two trucks. This jack-shaft supporting lever 12 has, near the free end thereof, a bearing collar or sleeve 13 which receives the inner end of a bearing 14, in which is journaled one-half of the jack-shaft 15. This bearing 14 is also supported in an aperture formed on the inner plate 16 of the truck frame, said truck frame having a correspondingly shaped outer plate 17 on the other side thereof. The jack shaft 15 has its outer end journaled in a bearing 18 interposed between the truck-frame plate 17 and the hub of a sprocket pinion 19 which is pinned on the jack shaft 15. The two bearings 14 and 18 are preferably made integral and are connected by a yoke portion 20, which is of sufficient size to receive the sprocket pinion 19. A sprocket chain 21 connects the sprocket pinion 19 with a driving sprocket-wheel 22, which is rigidly secured on a driving sleeve 23 which carries a driving wheel 24, which has recesses 25 in the periphery thereof adapted to coöperate with rivet pins 26 connecting the rails 27 of the shoes 28, which form the endless track.

The sleeve 23 is journaled on a bearing sleeve 28, which is supported on a shaft or rod 29 which extends between the sides 16 and 17 of the truck frame, being secured between said sides by nuts 30 screwed or otherwise secured on the ends of the shaft 29. Between the ends of the sleeve 23 and the side pieces 16 and 17 of the frame are a pair of idle wheels 31 and 32 which are of sufficient diameter to coöperate with the outermost pair of the four rails on the inner surface of the track.

The shoes 27 going to make up the tracks will be seen to consist of wide tread-sections 33, which have their outer faces corrugated or otherwise suitably arranged to grip the ground with which they contact. Each of these shoes is provided with four or more rails 34, which have reduced portions at their outer ends forming ears for the rivets 26. From Figs. 1 and 3, it will be apparent that the outer rails coöperate with the rims of the idle wheels 31 and 32, which thus serve to support the shoes near their outer edges and to remove some of the strain from the driving wheel 25.

Suitably secured between the side pieces 16 and 17 of the truck frame are a plurality of shafts or rods 35, which, as best seen in Fig. 4, preferably have the greatest diameter at their central portion, with reduced portions 36 and 37, and still more reduced portions at their extreme ends, which most reduced portions extend through the apertures in the side pieces 16 and 17 of the truck frame and coöperate with nuts 38 to secure the shafts 35 in position. These shafts have journaled thereon truck wheels 39 and 40, which are preferably connected by a common hub or sleeve 41. The wheels 39 and 40, as seen, coöperate with the alternate rails 34, and corresponding wheels 42 and 43 on the adjacent shafts 35 coöperate with the two rails with which the wheels 39 and 40 do not engage. This staggered arrangement of the truck wheels enables me to bring the supporting shafts 35 much closer together than would be possible if there were the customary truck wheels on each shaft coöperating with the customary two rails. This arrangement enables me to employ more truck wheels in the same space, thus distributing the weight of the tractor more uniformly over the track, and thus diminishing the liability to breakage of both the wheels and the track sections. It will be noted that, by my construction, the shafts 35 have their centers closer together than are the centers of the rivet pins 26, instead of being farther apart than are said pins, as in the ordinary construction.

The jack-shaft supporting levers 12 have their outer free ends 44 provided with apertures through which vertical bolts 45 can extend upward through apertures formed in the bottoms of cups 46 extending from the sides of the engine frame 10. Between the bottom of the cup 46 and the end 44 of the jack-shaft supporting lever 12, and surrounding the bolt 45, is secured a helically-coiled expanding spring 47; and above the bottom of the cup and surrounding the bolt 45, and extending up to a cap 48, is a helically-coiled expanding spring 49. It will be apparent that the two springs 47 and 49 serve to permit the relative movement of the truck-frame and the engine-frame, and to cushion any blows which tend to result from said relative movement. It will be understood, of course, that there is one of these truck frames on each side of the tractor, and that the two jack-shaft sections 15 are connected at the center by suitable differential driving gear, to which power is transmitted by chain and sprocket from the engine. The casing 50 for the differential is shown in Fig. 2, and I preferably inclose the inner portions of the jack-shaft sections 15 in sleeves 51 extending from the differential casing to the bearing 13 of the jack-shaft supporting lever 12. To suitably support the sleeves 51 on the jack-shaft sections 15, I pin in the outer ends of said sleeves the collars 52, which are of the proper diameter to permit the passage of the jack-shaft sections 15 therethrough.

At the forward end of the truck frame, I provide a shaft 53 corresponding to the shaft 29, and on said shaft I loosely journal a wheel 54, which may be similar to the driving wheel 23, although its function is merely that of an idler wheel, and the recesses therein might be omitted and the rim of the wheel coöperate with the innermost pair of rails. I also preferably provide on this same shaft 53 a pair of idle wheels 55 corresponding to the idle wheels 31 and 32, and having the same function. I may also interpose the roller bearings shown in Fig. 4 between the reduced end portions 36 and 37 of the shaft 35 and the hollow interiors of the truck wheels 39 and 40.

While I have shown and described my invention as embodied in the form which I at present consider best adapted to carry out its purposes, it will be understood that it is capable of modifications, and that I do not desire to be limited in the interpretation of the following claim except as may be necessitated by the state of the prior art.

What I claim as new, and desire to secure by Letters Patent of the United States, is:

In a device of the class described, the combination with a truck frame, of track driving and supporting wheels journaled therein, means for rotating the track driving wheels, a flexible track made up of a plurality of pivotally connected shoes having a plurality of rails, parallel truck-wheel shafts, having enlarged central portions, reduced portions adjacent said central portions and having still further reduced ends, said reduced ends supported in said frame, pairs of truck wheels on said shafts coöperating with alternate rails, and a hub mounted on said central enlarged portion connecting said truck wheels.

In witness whereof, I have hereunto set my hand and affixed my seal, this 2nd day of May, A. D. 1913.

CLYDE J. EASTMAN. [L. S.]

Witnesses:
JOHN HOWARD MCELROY,
JNO. G. ELLIOTT.